(12) United States Patent
Chen et al.

(10) Patent No.: US 11,467,135 B2
(45) Date of Patent: Oct. 11, 2022

(54) ONLINE MEASURING SYSTEM, METHOD AND APPLICATION FOR SEMI-VOLATILE ORGANIC COMPOUND IN GAS PHASE

(71) Applicant: PEKING UNIVERSITY, Beijing (CN)

(72) Inventors: Shiyi Chen, Beijing (CN); Yuexuan Du, Beijing (CN); Limin Zeng, Beijing (CN)

(*) Notice: Subject to any disclaimer, the term of this patent is extended or adjusted under 35 U.S.C. 154(b) by 236 days.

(21) Appl. No.: 16/886,676

(22) Filed: May 28, 2020

(65) Prior Publication Data
US 2020/0400622 A1 Dec. 24, 2020

(30) Foreign Application Priority Data
Jun. 24, 2019 (CN) .......................... 201910546688.6

(51) Int. Cl.
*G01N 30/60* (2006.01)
*G01N 30/08* (2006.01)
*G01N 30/02* (2006.01)

(52) U.S. Cl.
CPC ............. *G01N 30/08* (2013.01); *G01N 30/60* (2013.01); *G01N 2030/025* (2013.01)

(58) Field of Classification Search
CPC ... G01N 30/08; G01N 30/60; G01N 2030/025
See application file for complete search history.

(56) References Cited

U.S. PATENT DOCUMENTS 3,790,348 A * 2/1974 Bossart ................ G01N 31/005
436/154
5,109,691 A * 5/1992 Corrigan .............. G01N 1/2214
73/28.01
(Continued)

FOREIGN PATENT DOCUMENTS

CN  105203502 A  12/2015
CN  106124255 A  11/2016
(Continued)

OTHER PUBLICATIONS

Shuting Zhai et al., "Development and application of an online measurement system for ambient non-methane hydrocarbon", Acta Scientiae Circumstantiae, vol. 38, No. 2, Feb. 28, 2018.

*Primary Examiner* — Lisa M Caputo
*Assistant Examiner* — Alex T Devito

(57) ABSTRACT

An online measuring system for the semi-volatile organic compounds in the gas phase is provided in the disclosure. The system comprises a filter head, a three-way electromagnetic valve, an enrichment-thermal desorption device, a two-position six-way valve, a mass flow controller, a gas pump, a gas chromatograph, a primary capture trap, a secondary focus trap, and a gas supply and pressure control system, the inlet of the filter head is connected to be provided with a sampling object, the outlet of the filter head is connected with the port B of the three-way electromagnetic valve through a passivated stainless steel tube, the port C of the three-way electromagnetic valve is connected with the inlet of the primary capture trap through a passivated stainless steel tube, and the port A of the three-way electromagnetic valve is connected to the gas supply and pressure control system through a passivated stainless steel tube.

7 Claims, 8 Drawing Sheets

(56) References Cited

U.S. PATENT DOCUMENTS

| | | | | |
|---|---|---|---|---|
| 5,492,555 | A | * | 2/1996 | Strunk ................. G01N 30/463 95/87 |
| 6,382,035 | B1 | * | 5/2002 | Nichols ................. G01N 30/20 73/863.72 |
| 10,209,064 | B2 | | 2/2019 | Yang et al. |
| 2010/0288025 | A1 | * | 11/2010 | Hochgraeber ..... G01N 35/1097 73/61.55 |
| 2016/0059176 | A1 | | 3/2016 | Chandran et al. |
| 2017/0029941 | A1 | | 2/2017 | Allen et al. |

FOREIGN PATENT DOCUMENTS

| | | |
|---|---|---|
| CN | 106290688 A | 1/2017 |
| CN | 106404967 A | 2/2017 |
| CN | 208297430 U | 12/2018 |
| CN | 110333309 A | 10/2019 |

\* cited by examiner

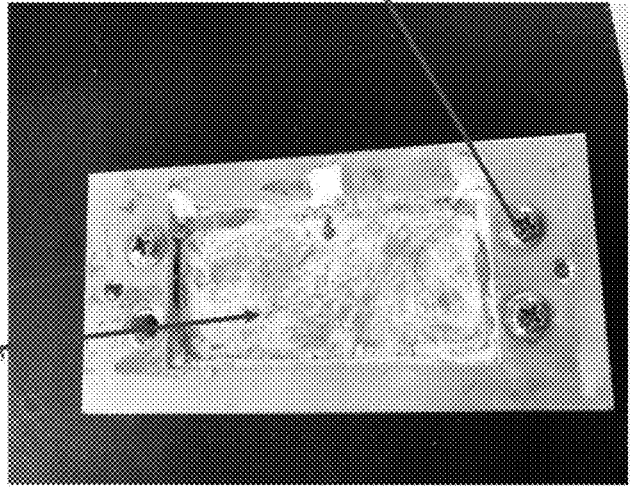

the aluminum casing of the low temperature module is hollow based on the size of the cooling sheet, and attaching the cooling sheet on after smearing the thermal conductive silicone the connecting screws between the copper and the aluminum casing, the stainless screws are used with the high temperature module, and the plastic screws with poor heat conductivity are used with the low temperature module

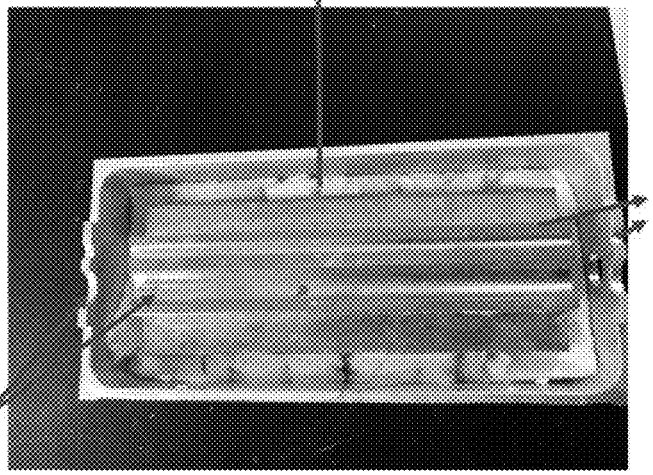

the semi-cylindrical hole is provided to fix the primary capture trap column after closing (the holes on the copper and the aluminum casing are same based on the size of the column)

insulating cotton the semi-cylindrical hole is provided to fix the secondary focus trap column after closing (the column is not needed when only enriching VOC)

FIG. 5(B)

ONLINE MEASURING SYSTEM, METHOD AND APPLICATION FOR SEMI-VOLATILE ORGANIC COMPOUND IN GAS PHASE

CROSS-REFERENCE TO RELATED APPLICATIONS

This application claims priority to Chinese Patent Application No. 201910546688.6 with a filing date of Jun. 24, 2019. The content of the aforementioned applications, including any intervening amendments thereto, are incorporated herein by reference.

TECHNICAL FIELD

The disclosure relates to the field of environmental monitoring technology, in particular to an online measuring system, method and application for semi-volatile organic compound in the gas phase.

BACKGROUND OF THE PRESENT INVENTION

In recent years, secondary pollution represented by particulate matter and ozone, especially fine particle pollution which has a major impact on climate change, atmospheric chemical reaction processes and human health, has been paid wide attention from all walks of life. In addition to the traditional theoretical volatile organic compounds (VOCs), semi-volatile organic compounds (SVOCs) are another important precursor, which have a greater contribution to the generation of the secondary organic aerosols (SOA). SVOCs in the atmosphere may form the secondary organic aerosols by homogenization and heterogeneity such as condensation and gas-particle distribution, thereby forming many fine particles and affecting the air quality. Monitoring the semi-volatile organic compounds in the gas phase online accurately is the basis for studying the characteristics and chemical mechanism of atmospheric organic pollutants, especially the supplement of the generation mechanism of the secondary pollution such as the atmospheric SOA.

At present, there are few studies on gas-phase SVOCs at home and abroad. Mostly, the gas-phase SVOCs are sampled off-line by the PUF or XAD-2, and then analyzed in the GCMS after being concentrated through the thermal desorption, the solvent elution, or the derivatization method. In the US Environmental Protection Agency EPA ambient air standard TO-13, the high-capacity PUF adsorption and the Soxhlet extraction are used to perform offline enrichment sampling of 21 semi-volatile organic polycyclic aromatic hydrocarbons (PAHs) in the atmosphere, and then GCMS is used to perform detection. For the specific monitoring instruments, there are no commercial instruments for online measurement of gas-phase SVOCs at home and abroad. Only the total amount of semi-volatile organic compounds and the concentration of particulate phase can be measured, and the gaseous content can be obtained by calculating the difference between the total amount and the particle content, through devices such as a two-stage gas chromatography, a semi-volatile organic matter measurement system (SV-TAG), etc. However, there may be a large error if measuring the gas-phase SVOC indirectly. According to the physico-chemical properties of the semi-volatile organic compounds in the gas phase, the gas-phase semi-volatile organic compounds containing the $C_{12}$-$C_{24}$ can be processed before enrichment through the direct online measurement technique using a specific porous organic adsorbent secondary thermal analysis method, and then detected by the GCFID. An innovative improvement has been made on the online measurement of atmospheric gas-phase SVOCs in the present disclosure, which can support the measuring technology when studying the source and transformation of the atmospheric gas-phase semi-volatile organic compounds.

Due to the high boiling point, low concentration, complex species and good viscosity of the atmospheric gas-phase SVOCs, the method and device for online measuring of the gas-phase semi-volatile organic compounds have not yet been given.

In view of the special physical and chemical characteristics of gas-phase SVOCs, it is necessary to design an enrichment device accordingly. Since the concentration of the atmospheric gas-phase SVOCs in the environment is extremely low (ppq level), the singly sampled volume will be limited when using a specific adsorbent for capture, resulting in a low enrichment multiple, which cannot meet the subsequent detection limit of the GCFID. Since the SVOCs have a high boiling point, a good viscosity, and can be transformed between the gas phase and the particle phase, the SVOCs in the collected atmospheric samples will be easily lost in the pipeline, which can cause the lower sensitivity of the system. When the adsorbent temperature control method is used to enrich the SVOCs, the accurate control of the temperature is a key technology for quantitative measurement of the organic compounds, and how to minimize the volume and energy consumption of the pretreatment device while ensuring the enrichment efficiency and recovery rate of the sample is still an urgent problem to be solved.

There is no publication related to the present disclosure been found after search.

SUMMARY OF PRESENT INVENTION

In order to solve the defects in the prior art, an online measuring system, method and application for the semi-volatile organic compound in the gas phase are provided in the disclosure. The gas path of the system is simple, and the online enrichment measurement can be realized for the gas-phase SVOCs, and the low-concentration semi-volatile organic compounds under the atmospheric environment condition can be directly measured online, thereby avoiding the error of the traditional indirect calculating method. The system has a time resolution of 23-53 min and has a compact structure. Its devices are compact, operations are simple and results are reliable, and it can realize the accurate online measurement of the atmospheric gas-phase semi-volatile organic compounds.

According to one aspect of the disclosure, an online measuring system for the semi-volatile organic compounds in the gas phase is provided. The system comprises a filter head, a three-way electromagnetic valve, an enrichment-thermal desorption device, a two-position six-way valve, a mass flow controller, a gas pump, a gas chromatograph, a primary capture trap, a secondary focus trap, and a gas supply and pressure control system, the three-way electromagnetic valve includes a port A, a port B, and a port C, the inlet of the filter head is connected to be provided with a sampling object, the outlet of the filter head is connected with the port B of the three-way electromagnetic valve through a passivated stainless steel tube, the port C of the three-way electromagnetic valve is connected with the inlet of the primary capture trap through a passivated stainless steel tube, and the port A of the three-way electromagnetic valve is connected to the gas supply and pressure control system through a passivated stainless steel tube.

The two-position six-way valve includes an interface A, an interface B, an interface C, an interface D, an interface E, and an interface F, the outlet of the primary capture trap is connected to the interface E of the two-position six-way valve via a passivated stainless steel tube with an external diameter of ⅛ inch, the interface F of the two-position six-way valve is connected to the inlet of the secondary focus trap via a passivated stainless steel tube with an external diameter of ⅛, and the interface C of the two-position six-way valve is connected to the outlet of the secondary focus trap, the interface D of the two-position six-way valve is connected to the inlet of the mass flow controller, the interface A of the two-position six-way valve is connected to the gas supply and pressure control system, and the interface B of the two-position six-way valve is connected to a capillary column of the gas chromatograph, the outlet of the mass flow controller is connected to the inlet of the gas pump, and the outlet of the gas pump is connected to the atmosphere.

The enrichment-thermal desorption device is connected to the primary capture trap and the secondary focus trap, and the enrichment-thermal desorption device can provide a constant low enrichment temperature and a constant high desorption temperature for the primary capture trap and the secondary focus trap.

The gas supply and pressure control system is capable of providing the nitrogen, the helium, the hydrogen, and the compressed air with a purity of not less than 99.999%, and capable of controlling the pressure of the gas path.

Moreover, the filter head is made of the high-purity polytetrafluoroethylene.

Alternatively, the primary capture trap and the secondary focus trap are filled with adsorbents, and the diameter of the primary capture trap column is larger than the diameter of the secondary focus trap.

Alternatively, the primary capture trap and the secondary focus trap are both made of 316 stainless steel tubes.

Alternatively, the helium, the hydrogen, and the compressed air can be used in the gas chromatography, and helium or nitrogen can be used as a carrier gas within the pipeline of the system.

Alternatively, the constant low enrichment temperature is −23° C., and the constant high thermal desorption temperature is 310-325° C.

Moreover, the pipes in the system between the primary capture trap and the inlet of the gas chromatographic are all tightly wound with heating wires capable of setting a constant 280° C. the entire pipeline of the system between the primary capture trap and the inlet of the gas chromatography, and the interface of the two-position six-way valve is provided with a heat tracing device.

Moreover, the enrichment-thermal desorption device includes two combined temperature modules and a pneumatic driving device, the primary capture trap and the secondary focus trap are respectively connected to the two combined temperature modules via detachable connections. The two combined temperature modules are disposed opposite to each other in the longitudinal direction, and each combined temperature module is disposed in a vertical direction. The two combined temperature modules are capable of performing low-temperature adsorption and enrichment of the gas-phase semi-volatile organic compounds in the atmosphere and then performing high-temperature thermal desorption operation. The pneumatic driving device is respectively connected with two combined temperature modules, the primary capture trap, and the secondary focus trap, and the pneumatic driving device can drive the two combined temperature modules to move closer to each other or away from each other in the longitudinal direction, when the combined temperature modules are moved closer to each other and contacted with the device, the primary capture trap and the secondary focus trap can be tightly clamped, and when the combined temperature modules are moved away from each other and separated from the device, the primary capture trap and the secondary focus trap can be released, and the pneumatic driving device can also drive the primary capture trap and the secondary focus trap to move up or down in the vertical direction.

Moreover, the combined temperature module includes a high temperature module and a low temperature module disposed in connection, the high temperature module includes an aluminum thermal-block casing, a copper medium, an insulating cotton, a stainless steel screw, a heating rod, and a temperature sensor, the aluminum thermal-block casing is arranged in a horizontal direction and has a hollow shape with an opening on the longitudinal side. The copper medium is provided in the hollow interior of the aluminum thermal-block casing, the insulating cotton is provided between the copper medium and the aluminum thermal-block casing densely, and the copper medium is connected to the aluminum thermal-block casing via the high-temperature-resistant stainless steel screw.

A semi-cylindrical upper capture trap placement half-slot is provided horizontally in connection to the central portion of the opening side of the aluminum thermal-block casing, the copper medium and the insulating cotton. An upper secondary focus trap placement half-slot is provided in parallel with distance on the aluminum thermal-block casing, the copper medium and the insulating cotton. The upper capture trap placement half-slot is able to tightly fit half of the primary capture trap, and the upper secondary focus trap placement half-slot is able to tightly fit half of the secondary focus trap.

Two pairs of blind holes are provided separately on the horizontal side of the aluminum thermal-block casing and the copper medium, and each pair of blind holes are correspondingly disposed on the aluminum thermal-block casing and the copper medium, each of the two pairs of blind holes can tightly fit the heating rod capable of providing a required high temperature and the temperature sensor capable of detecting the temperature of the copper medium.

The low temperature module includes an aluminum cold-block casing, a copper medium, an insulating cotton, a plastic screw, a cooling sheet and a temperature sensor, the aluminum cold-block casing is arranged in a horizontal direction and has a hollow shape with an opening on the longitudinal side. The copper medium is provided in the hollow interior of the aluminum cold-block casing, the copper medium at the opposite side of the opening is closely connected with the cold end of the cooling sheet through a thermal grease layer, the aluminum cold-block casing outside the cooling sheet is hollow, the hot end of the cooling sheet can be connected with the overheated-copper-tube heat sink through another thermal grease layer, the insulating cotton is provided between the copper medium and the aluminum cold-block casing densely, and the copper medium is connected to the aluminum cold-block casing via the plastic screw.

A semi-cylindrical bottom capture trap placement half-slot is provided horizontally in connection to the central portion of the opening side of the aluminum cold-block casing, the copper medium and the insulating cotton. A bottom secondary focus trap placement half-slot is provided in parallel with distance on the aluminum cold-block casing, the copper medium and the insulating cotton. The bottom capture trap placement half-slot is able to tightly fit half of the primary capture trap, and the bottom secondary focus trap placement half-slot is able to tightly fit half of the secondary focus trap.

Another two pairs of blind holes are provided separately on the horizontal side of the aluminum cold-block casing and the copper medium, and each pair of blind holes are correspondingly disposed on the aluminum cold-block casing and the copper medium, each of the two pairs of blind holes can tightly fit the temperature sensor capable of detecting the temperature of the copper medium, the outer side of the copper medium is closely attached with a cooling sheet capable of providing the demanded low temperature. The high temperature module and the low temperature module on the same side are arranged in parallel with distance in the vertical direction and connected to each other through the plastic connecting column.

The two upper capture trap placement half-slots and two bottom capture trap placement half-slots of the two combined temperature modules positioned opposite to each other can respectively be relatively close to each other, and they can be tightly fitted with the primary capture trap when they are close. The two upper focus trap placement half-slots and two bottom focus trap placement half-slots of the two combined temperature modules positioned opposite to each other can respectively be relatively close to each other, and they can be tightly fitted with the secondary focus trap when they are close.

Moreover, the pneumatic driving device comprises a finger platform cylinder, a pen-shaped cylinder, a plurality of two-position five-way valves and a PU pneumatic high-pressure tube, the finger platform cylinder is connected with the bottom of each combined temperature module by stainless steel screws. The air inlet and the air outlet of the finger platform cylinder are respectively connected with a working port of the two-position five-way valve, the air inlet of the two-position five-way valve is connected with the gas supply and the pressure control system, and the two exhaust ports of the two-position five-way valve are connected with a muffler, and the finger platform cylinder can drive the two temperature modules to move closer to each other or away from each other in the longitudinal direction through the two-position five-way valve and the gas supply and the pressure control system.

The horizontal ends of the primary capture trap and the secondary focus trap are respectively connected to a pen-shaped cylinder, so that a pair of pen-shaped cylinders jointly drive the movement of the primary capture trap and the secondary focus trap, the pen-shaped cylinders are connected to the primary capture trap and the secondary focus trap through a Z-shaped stainless steel snap ring and a rectangular stainless steel module. The rectangular stainless steel module can be detachably engaged with the primary capture trap and the secondary focus trap. The rectangular stainless steel module is connected with the Z-shaped stainless steel snap ring via the stainless steel screw, the Z-shaped stainless steel snap ring is connected with the pen-shaped cylinder through a hexagonal stainless steel screw.

The inlet port and the outlet port of the pen-shaped cylinder are respectively connected with the first working port and the second working port of another two-position five-way valve through the PU pneumatic high-pressure tube, the air inlet of the two-position five-way valve is connected with the gas supply and pressure control system, the two exhaust ports of the two-position five-way valve are connected with the muffler, the pen-shaped cylinder can drive the primary capture trap and the secondary focus trap move back and forth in a vertical direction through driving the two-position five-way valve and the gas supply and the pressure control system.

Alternatively, the device further includes a heat insulating gasket, and the joints between the plastic connecting column and the high temperature module and the low temperature module are provided with the heat insulating gaskets to minimize the temperature interface.

Alternatively, the rectangular stainless steel module comprises two rectangular stainless steel sub-modules, stainless steel screws and screw holes, and the two rectangular stainless steel sub-modules are arranged in parallel in a horizontal direction and are oppositely arranged in a vertical direction, two semi-circular holes are arranged oppositely on the central area of the facing sides of the two rectangles stainless steel sub-modules. When the two rectangular stainless steel sub-modules are closely fitted, the two upper and lower semi-circular holes can be tightly engaged to fit the primary capture trap and the secondary focus trap, so the primary capture trap and the secondary focus trap can be fixed. The horizontal outer ends of the two rectangular stainless steel sub-modules are symmetrically disposed with screw holes in the horizontal direction, the screw holes are arranged in a vertical direction, and the stainless steel screws can be threadedly engaged in the screw holes.

Moreover, the online measuring system further includes a programmable logic controller and a temperature transmitter, the programmable logic controller is respectively electrically connected with the three-way electromagnetic valve, the two-position six-way valve, the gas chromatograph, the mass flow controller, the gas pump, the enrichment-thermal desorption device and the temperature transmitter, and it can simultaneously control the opening and closing of each component in the online measuring system for semi-volatile organic compounds in a gas phase and monitor various system parameters. The temperature transmitter is connected with the enrichment-thermal desorption device, the temperature transmitter is connected to the programmable logic controller to control and monitor the constant high temperature and constant low temperature of the enrichment-thermal desorption device, and the temperature control accuracy is ±0.1° C.

The use of the online measuring system for semi-volatile organic compounds in gas phase has been described as above.

The online measuring method for using the above system comprises following steps.

In an aging mode, in order to remove the substances or impurities that may remain in the pipeline, the carrier gas purges and ages the pipelines and components between the three-way electromagnetic valve and the mass flow controller after passing through the gas supply and pressure control system, while both the primary capture trap and the secondary focus trap are in located where the high-temperature thermal desorption is performed in the enrichment-thermal desorption device.

In a sampling mode, the primary capture trap and the secondary focus trap are located where the low-temperature enrichment is performed in the enrichment-thermal desorption device, a atmospheric sample is discharged through the gas pump after passing through the filter head, the three-way electromagnetic valve, the primary capture trap, the secondary focus trap, the two-position six-way valve and the mass flow controller by the suction of the gas pump, while the target organic compounds in the atmosphere is enriched by the primary capture trap.

In a sweep mode, the primary capture trap and the second focus trap are located where in the low-temperature enrichment is performed in the enrichment-thermal desorption device, the carrier gas will sweep the primary capture trap and the subsequent pipelines and components to remove excess interfering gas such as residual oxygen therein after passing through the gas supply and pressure control system and the three-way electromagnetic valve.

In a focus mode, the primary capture trap is driven to move to where the high-temperature thermal desorption is performed in the enrichment-thermal desorption device while the secondary focus trap is still located where the low-temperature enrichment is performed in the enrichment-thermal desorption device, and the carrier gas will sweep a test sample from the primary capture trap to the secondary focus trap at a low-temperature enrichment state to perform secondary capture of the target organic compound after passing through the gas supply and pressure control system and the three-way electromagnetic valve.

In an injection mode, the secondary focus trap is driven to move to where the high-temperature thermal desorption is performed in the enrichment-thermal desorption device, and the carrier gas will carry the test sample released from the secondary focus trap at the high temperature module into the gas chromatograph to perform separating and measuring after passing through the gas supply and pressure control system, the three-way electromagnetic valve and the primary capture trap, thereby completing a sampling and analysis cycle.

The sampling and analysis cycle will be repeated if the measurement is continued.

The advantages and positive effects achieved in the present disclosure are as follows.

The system of the invention has simple gas paths, can realize online enrichment of the gas-phase SVOCs and online monitoring of the low concentration semi-volatile organic compounds under the atmospheric environmental conditions, and the time resolution is 23-53 minutes. It can avoid the errors in the traditional indirect calculation method and it has a compact structure. Its devices are compact, operations are simple and results are reliable, and it can realize the accurate online measurement of the atmospheric gas-phase semi-volatile organic compounds. The system is based on the thermal desorption of a specific adsorbent which enables accurate online monitoring of the gas-phase semi-volatile organic compounds containing $C_{12}$-$C_{24}$.

In the system of the invention, the secondary focus trap is used to realize re-capture and re-desorption of the low-concentration semi-volatile organic compounds, and the multiple focusing processes can reduce the detection limit of the system and improve the sensitivity of analysis and detection.

In view of the extremely low concentration of the semi-volatile organic compounds in the ambient atmosphere, single enrichment is difficult to meet the detection limit of subsequent detectors. In the system of the present disclosure, based on the physical and chemical characteristics of the semi-volatile organic compounds in the gas phase, the pipelines and the components are passivated and heating devices are provided in all system to minimize the loss of the semi-volatile organic compounds to be tested in the pipeline.

The method of the invention realizes the innovation of the method, and can realize the online measurement of the ultra-low-concentration atmospheric semi-volatile organic compounds in the gas phase, and fills the relevant technical blank.

In the system of the invention, only the three-way electromagnetic valve (one) and the two-position six-way valve are used, which simplifies the structure of the gas path, shortens the sample transport path, reduces the dead volume, and minimizes the loss of the samples during the sampling and analysis, and improves the measuring accuracy of the instrument.

DESCRIPTION OF THE DRAWINGS

FIG. 5(A), FIG. 5(B) and FIG. 5(C) are schematic diagrams of a manufacturing process of the enrichment-thermal desorption device of the system in the present disclosure.

DETAILED DESCRIPTION OF PREFERRED EMBODIMENTS

The invention is further described in detail below with reference to the specific embodiments. The following examples are merely illustrative but not limiting, and the scope of the invention is not limited thereto.

Structures not specifically described in the present disclosure can be understood as conventional structures in the art.

Figure 1:
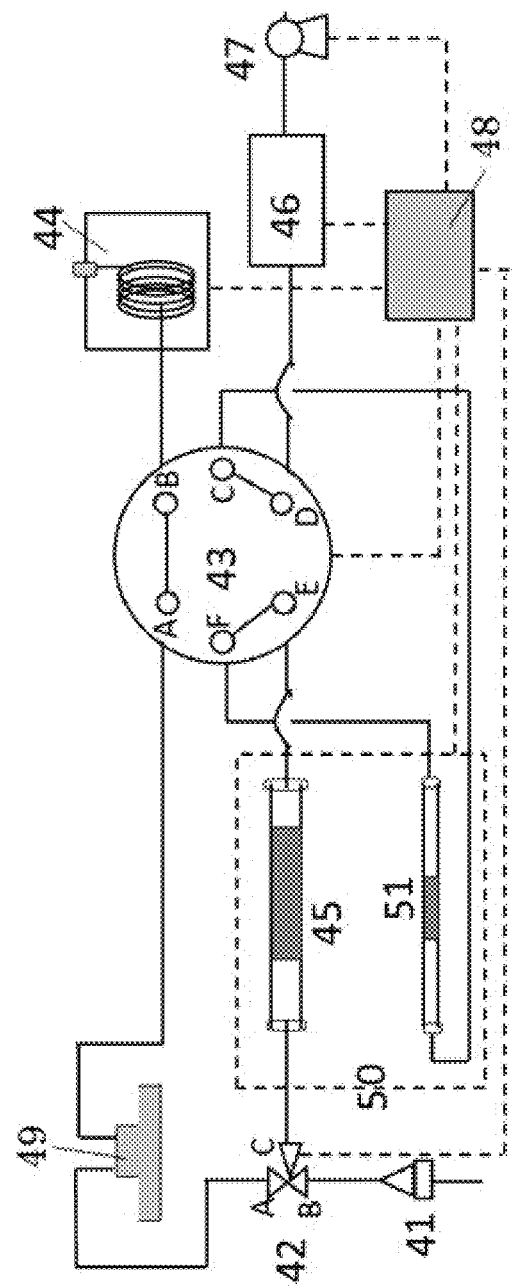
FIG. 1 is a schematic diagram of the structure of the system in the present disclosure.

Referring to FIG. 1, an online measuring system for semi-volatile organic compounds in the gas phase comprises a filter head 41, a three-way electromagnetic valve 42, an enrichment-thermal desorption device 50, a two-position six-way valve 43, a mass flow controller 46, a gas pump 47, a gas chromatograph 44, a primary capture trap 45, a secondary focus trap 51, and a gas supply and pressure control system 49. The three-way electromagnetic valve includes a port A, a port B and a port C. The inlet of the filter head is connected to the sampled object (such as the atmosphere), and the outlet of the filter head is connected with the port B of the three-way electromagnetic valve through a passivated stainless steel tube. The port C of the three-way electromagnetic valve is connected to the inlet of the primary capture trap through a passivated stainless steel tube, and the port A of the three-way electromagnetic valve is connected with the gas supply and pressure control system through a passivated stainless steel tube.

The two-position six-way valve includes an interface A, an interface B, an interface C, an interface D, an interface E, and an interface F, the outlet of the primary capture trap is connected to the interface E of the two-position six-way valve via a passivated stainless steel tube with an external diameter of ⅛ inch, the interface F of the two-position six-way valve is connected to the inlet of the secondary focus trap via a passivated stainless steel tube with an external diameter of ⅛ inch, and the interface C of the two-position six-way valve is connected to the outlet of the secondary focus trap, the interface D of the two-position six-way valve is connected to the inlet of the mass flow controller, the interface A of the two-position six-way valve is connected to the gas supply and pressure control system, and the interface B of the two-position six-way valve is connected to a capillary column of the gas chromatograph that may be a commercial instrument whose chromatographic column and operation parameters can be revised based on relevant documents, the outlet of the mass flow controller is connected to the inlet of the gas pump, and the outlet of the gas pump is connected to the atmosphere.

The enrichment-thermal desorption device is connected to the primary capture trap and the secondary focus trap, and the enrichment-thermal desorption device can provide a constant low enrichment temperature and a constant high desorption temperature for the primary capture trap and the secondary focus trap to achieve accurate collection of the organic compounds.

The gas supply and pressure control system is capable of providing the nitrogen, the helium, the hydrogen, and the compressed air with a purity of not less than 99.999%, and capable of controlling the pressure of the gas path.

In the embodiment, the filter head is made of high-purity polytetrafluoroethylene, and the filter head is equipped with a high-purity polytetrafluoroethylene filter membrane which can filter fine particles to realize separate collection of SVOCs in the gas phase.

Alternatively, the primary capture trap and the secondary focus trap are internally filled with adsorbents to achieve efficient capture of the organic compounds containing $C_{12}$-$C_{24}$. Preferably, the adsorbent is Tenax GR, which is suitable for the capture and enrichment of the trace high-boiling organic compounds in environmental analysis. In view of the fact that the primary capture trap is used to enrich the target organic compounds from the atmospheric samples, which needs sampling a large air flow, while the secondary focus trap is used to re-capture the material accumulated in the primary capture trap, so the column diameter of the primary capture trap is larger than that of the secondary focus trap, and correspondingly more adsorbents are filled in it.

Alternatively, the primary capture trap and the secondary focus trap are both made of 316 stainless steel tubes (GC grade) with good mechanical properties and thermoelectric properties, which do not affect the components to be tested, and are passivated before use. The pipelines are made of Passek's passivated stainless steel tube with an external diameter of ⅛ inch to reduce the adhesion loss of the high carbon organic compounds in the pipeline.

Alternatively, the helium, the hydrogen, and the compressed air can be used in the gas chromatography, and helium or nitrogen can be used as a carrier gas within the pipeline of the system.

In the present embodiment, in order to minimize the loss of the captured high-carbon organic compounds in the apparatus due to the temperature unevenness and adhesion, the pipelines between the primary capture trap and the gas chromatographic inlet is tightly wound with a heating wire (preferably, the heating wire is a heating wire of 0.77 mm), and the heating wire (the heat tracing system) is capable of setting a constant 280° C. for the pipelines between the primary capture trap and the gas chromatographic inlet to achieve the heat tracing of the pipelines therein. A heat tracing device (not shown) is provided at the interface of the two-position six-way valve to prevent the loss of the organic compounds due to the local low temperature.

Figure 2:
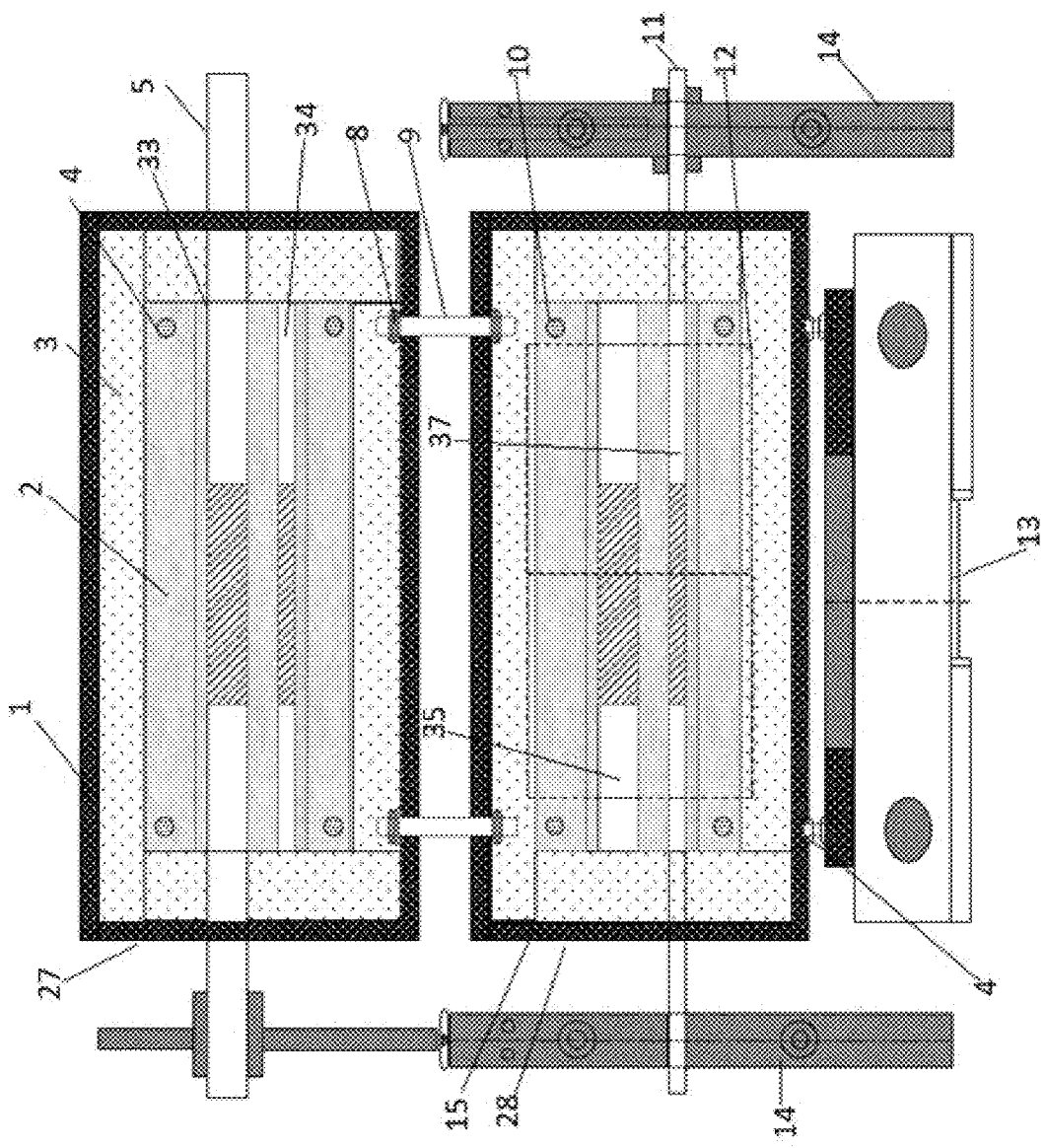
FIG. 2 is a half-section schematic diagram of the structure of the enrichment-thermal desorption device in FIG. 1 (the pneumatic driving device is omitted).
Figure 3:
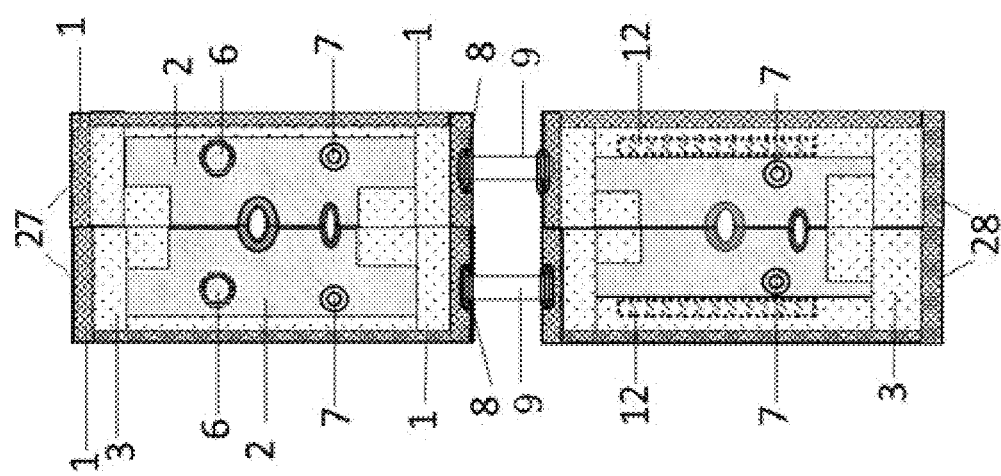
FIG. 3 is a partial cross-sectional view of the structure of two combined temperature modules in FIG. 2.
Figure 4:
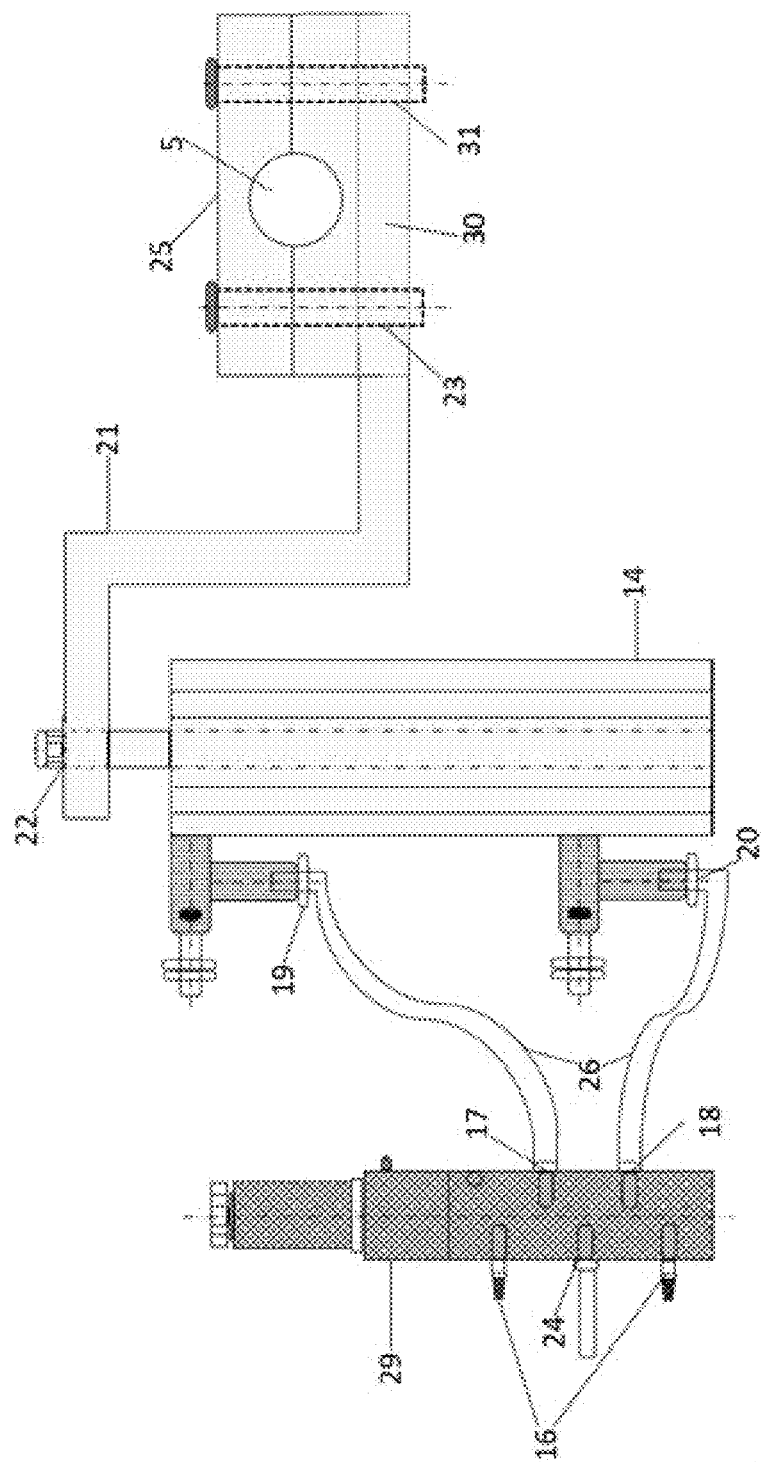
FIG. 4 is a schematic diagram of partial structure of the pneumatic driving device of the enrichment-thermal desorption device in FIG. 1.

Referring to FIG. 2-4, in the present embodiment, the enrichment-thermal desorption device includes two combined temperature modules and a pneumatic driving device, the primary capture trap and the secondary focus trap are respectively connected to the two combined temperature modules via detachable connections. The two combined temperature modules are disposed opposite to each other in the longitudinal direction, and each combined temperature module is disposed in a vertical direction. The two combined temperature modules are capable of performing low-temperature adsorption and enrichment of the gas-phase semi-volatile organic compounds in the atmosphere and then performing high-temperature thermal desorption operation. The pneumatic driving device is respectively connected with two combined temperature modules, the primary capture trap, and the secondary focus trap, and the pneumatic driving device can drive the two combined temperature modules to move closer to each other or away from each other in the longitudinal direction, when the combined temperature modules are moved closer to each other and contacted with the device, the primary capture trap and the secondary focus trap can be tightly clamped, and when the combined temperature modules are moved away from each other and separated from the device, the primary capture trap and the secondary focus trap can be released, and the pneumatic driving device can also drive the primary capture trap and the secondary focus trap to move up or down in the vertical direction.

The enrichment-thermal desorption device of the system includes two combined temperature modules and a pneumatic driving device. The two combined temperature modules are capable of performing low-temperature adsorption and enrichment of the gas-phase semi-volatile organic compounds in the atmosphere and then performing high-temperature thermal desorption operation. The pneumatic driving device can drive the primary capture trap and the secondary focus trap to move up or down in the vertical direction. The device has a compact structure which is capable of performing low-temperature adsorption and enrichment of the gas-phase semi-volatile organic compounds in the atmosphere and then performing high-temperature thermal desorption operation, and it can be used for online sampling and pretreatment of the organic compounds in the gas phase.

In this embodiment, the combined temperature module includes a high temperature module 27 and a low temperature module 28 that are connected to each other, the high temperature module includes an aluminum thermal-block casing 1, a copper medium 2, an insulating cotton 3, a stainless steel screw 4, a heating rod 6 and a temperature sensor 7. The aluminum thermal-block casing is arranged in a horizontal direction and has a hollow shape with an opening on the longitudinal side. The copper medium is provided in the hollow interior of the aluminum thermal-block casing, the insulating cotton is provided between the copper medium and the aluminum thermal-block casing densely to reduce the heat loss, and the copper medium is connected to the aluminum thermal-block casing via the high-temperature-resistant stainless steel screw.

A semi-cylindrical upper capture trap placement half-slot 33 is provided horizontally in connection to the central portion of the opening side of the aluminum thermal-block casing, the copper medium and the insulating cotton. An upper secondary focus trap placement half-slot 34 is provided in parallel with distance on the aluminum thermal-block casing, the copper medium and the insulating cotton. The upper capture trap placement half-slot is able to tightly fit half of the primary capture trap, and the upper secondary focus trap placement half-slot is able to tightly fit half of the secondary focus trap.

Two pairs of blind holes are provided separately on the horizontal side of the aluminum thermal-block casing and the copper medium, and each pair of blind holes are correspondingly disposed on the aluminum thermal-block casing and the copper medium, each of the two pairs of blind holes can tightly fit the heating rod capable of providing a required high temperature and the temperature sensor capable of detecting the temperature of the copper medium.

The low temperature module includes an aluminum cold-block casing 15, a copper medium, an insulating cotton, a plastic screw 10, a cooling sheet 12 and a temperature sensor, the aluminum cold-block casing is arranged in a horizontal direction and has a hollow shape with an opening on the longitudinal side. The copper medium is provided in the hollow interior of the aluminum cold-block casing. To achieve the uniform cooling and the lower temperature, the copper medium at the opposite side of the opening is closely connected with the cold end of the cooling sheet through a thermal grease layer, the aluminum cold-block casing outside the cooling sheet is hollow, the hot end of the cooling sheet can be connected with the overheated-copper-tube heat sink through another thermal grease layer (not shown in the FIG.s). The insulating cotton is provided between the copper medium and the aluminum cold-block casing densely to reduce the temperature interface, and the copper medium is connected to the aluminum cold-block casing via the plastic screw with a poor thermal conductivity.

A semi-cylindrical bottom capture trap placement half-slot 35 is provided horizontally in connection to the central portion of the opening side of the aluminum cold-block casing, the copper medium and the insulating cotton. A bottom secondary focus trap placement half-slot 37 is provided in parallel with distance on the aluminum cold-block casing, the copper medium and the insulating cotton. The bottom capture trap placement half-slot is able to tightly fit half of the primary capture trap, and the bottom secondary focus trap placement half-slot is able to tightly fit half of the secondary focus trap.

Two pairs of blind holes are provided separately on the horizontal side of the aluminum cold-block casing and the copper medium, and each pair of blind holes are correspondingly disposed on the aluminum cold-block casing and the copper medium, each of the two pairs of blind holes can tightly fit the temperature sensor capable of detecting the temperature of the copper medium, the outer side of the copper medium is closely attached with a cooling sheet capable of providing the demanded low temperature. The high temperature module and the low temperature module on the same side are arranged in parallel with distance in the vertical direction and connected to each other through the plastic connecting column 9 (preferably, the plastic connecting column is a M 3*8 mm PTFE straight-through joint).

The two upper capture trap placement half-slots and two bottom capture trap placement half-slots of the two combined temperature modules positioned opposite to each other can respectively be relatively close to each other, and they can be tightly fitted with the primary capture trap when they are close. The two upper focus trap placement half-slots and two bottom focus trap placement half-slots of the two combined temperature modules positioned opposite to each other can respectively be relatively close to each other, and they can be tightly fitted with the secondary focus trap when they are close.

In the embodiment, the pneumatic driving device comprises a finger platform cylinder 13, a pen-shaped cylinder 14, a plurality of two-position five-way valves 29 and a PU pneumatic high-pressure tube 26. The finger platform cylinder is connected with the bottom of each combined temperature module by stainless steel screws (preferably, the M3*6 stainless steel screw). The air inlet and the air outlet of the finger platform cylinder are respectively connected with a working port of the two-position five-way valve, the air inlet of the two-position five-way valve is connected with the gas supply and the pressure control system, and the two exhaust ports of the two-position five-way valve are connected with a muffler (not shown in the FIG.s). The finger platform cylinder can drive the two temperature modules to move closer to each other or away from each other in the longitudinal direction through the two-position five-way valve and the gas supply and the pressure control system, thereby controlling the opening and closing of the two temperature modules as a whole to realize the subsequent opening and closing actions of the high/low temperature modules.

In order to make both the primary capture trap and the secondary focus trap move up and down evenly, the horizontal ends of the primary capture trap and the secondary focus trap are respectively connected to a pen-shaped cylinder, so that a pair of pen-shaped cylinders jointly drive the movement of the primary capture trap and the secondary focus trap. The pen-shaped cylinders are connected to the primary capture trap and the secondary focus trap through a Z-shaped stainless steel snap ring 21 and a rectangular stainless steel module 25. The rectangular stainless steel module can be detachably engaged with the primary capture trap and the secondary focus trap. The rectangular stainless steel module is connected with the Z-shaped stainless steel snap ring via the stainless steel screw 23. The Z-shaped stainless steel snap ring is connected with the pen-shaped cylinder through a hexagonal stainless steel screw 22, thus the pen-shaped cylinder is connected indirectly with the primary capture trap and the second focus trap.

The inlet port 19 and the outlet port 20 of the pen-shaped cylinder are respectively connected with the first working port 17 and the second working port 18 of another two-position five-way valve through the PU pneumatic high-pressure tube. The air inlet 24 of the two-position five-way valve is connected with the gas supply and pressure control system, and the two exhaust ports of the two-position five-way valve are connected with the muffler 16. The pen-shaped cylinder can drive the primary capture trap and the secondary focus trap move back and forth in a vertical direction through driving the two-position five-way valve and the gas supply and the pressure control system. Specifically, the pen-shaped cylinder drives the primary capture trap and the secondary focus trap move back and forth in a vertical direction by switching the different working states of the two-position five-way valve.

Figure 5A:
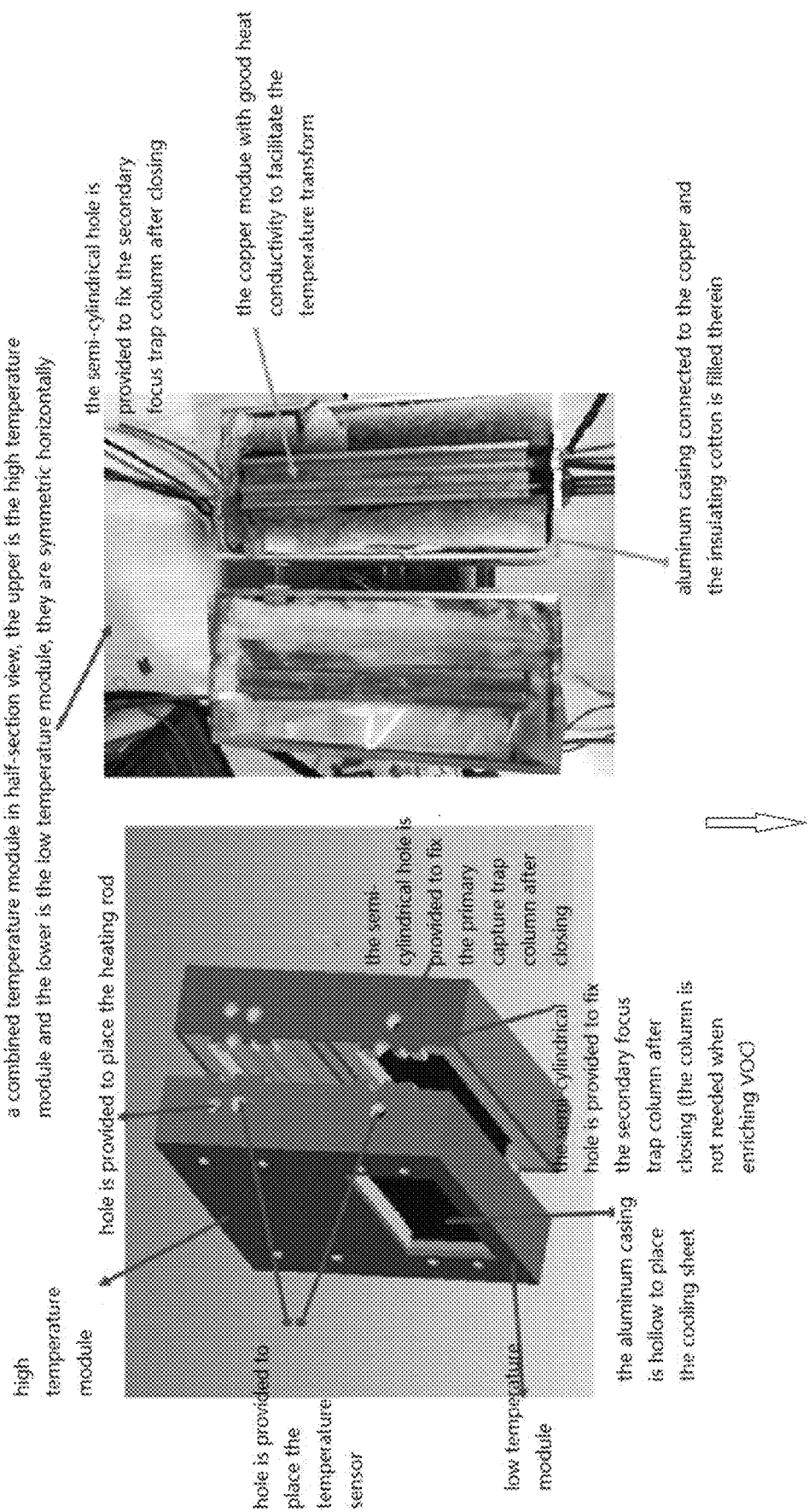
Figure 5C:
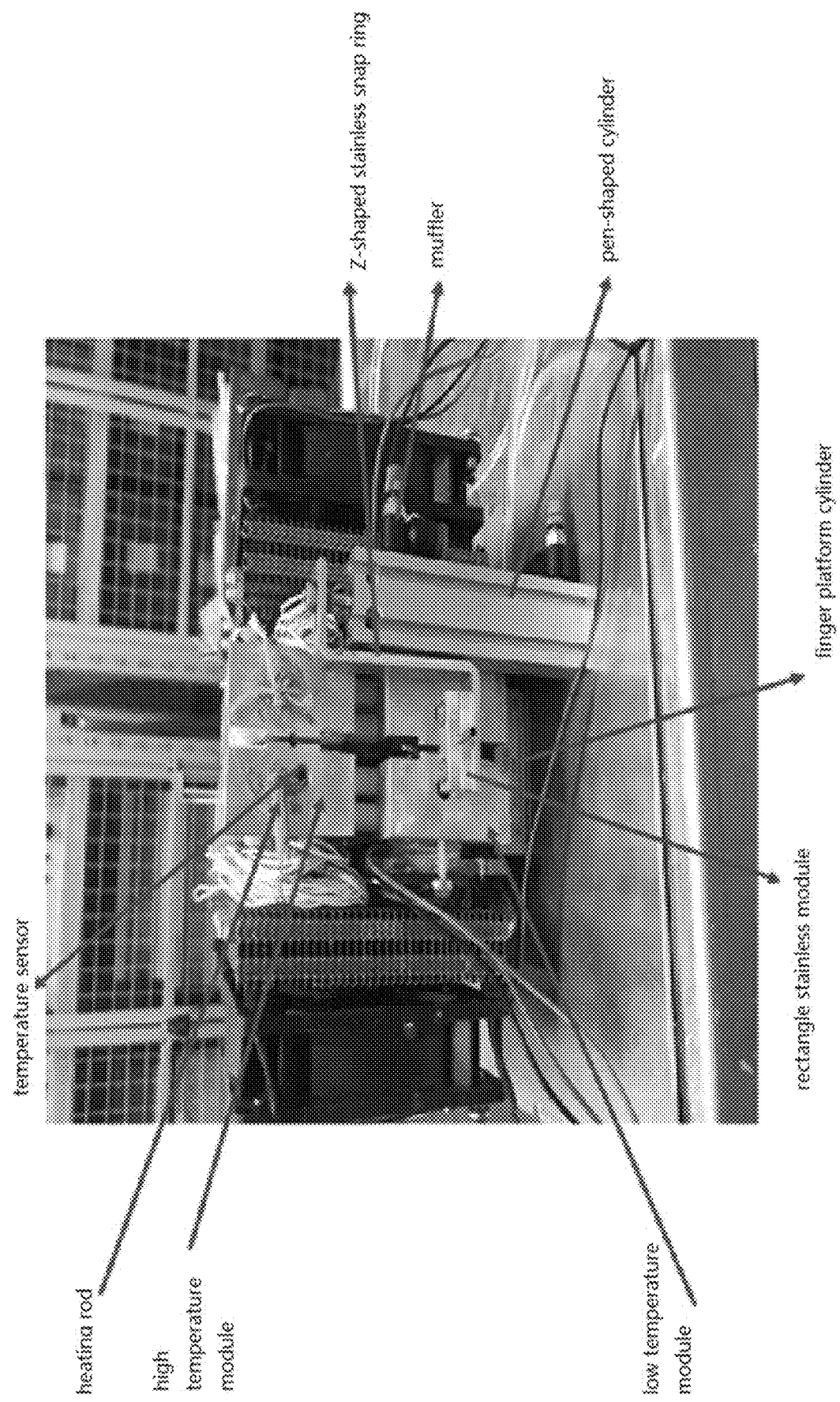

Referring to FIG. 5(A), FIG. 5(B) and FIG. 5(C), a process flow for the enrichment-thermal desorption device of the system in the present disclosure is shown, and the relevant steps are specifically explained as follows.

In the high/low temperature modules of the enrichment-thermal desorption device of the system in the invention, the brass medium having a smaller specific heat capacity and the aluminum casing having a smaller thermal conductivity are used, and the insulating cotton is filled therein, in order to reduce the heat dissipation. In order to achieve the balance and the miniaturization of the high and low temperature modules, a heating module is placed above and a cooling module is placed underneath, thus forming a combined temperature module. Wherein a plastic connecting column with poor thermal conductivity and an insulation pad are used between the hot block and the cold block to minimize the temperature interface, so the temperature module includes a pair of oppositely combined temperature modules. The primary capture trap and the secondary focus trap are placed at the opening of the copper block based on their sizes (in the upper capture trap placement half-slots, the bottom capture trap placement half-slots, the upper secondary focus trap placement half-slots and the bottom secondary focus trap placement half-slots). The primary capture trap and the secondary focus trap can be held once when the corresponding temperature modules are closed, to achieve rapid temperature transfer. A hole is provided at a side of the high temperature module to place the heating rod and the temperature sensor to achieve rapid heat transfer and temperature detection. Dual cooling sheets are used for cooling to reduce the enrichment temperature and increase the concentration factor as much as possible, and they are tightly attached on the outside of the copper block via the thermal silicon and a temperature sensor is placed at the opening of a side of the cold copper block to accurately detect the temperature. The high and low temperature combination modules are placed at the finger platform cylinder, and the opening and closing control of the temperature modules are realized through the two-position five-way valve and the gas supply and pressure control system. In order to make the primary capture trap and secondary focus trap quickly switch between the high and low temperature modules, the pen-shaped cylinder is used to achieve the rise and fall of the capture trap between the high temperature module and the low temperature module. In the invention, a plurality of quick-connect joints are provided, different passages can be formed between the same gas source and the cylinder through adjusting each quick-connect joint, so the same gas source can not only drive the opening and closing of the finger platform cylinder, but also drive the rise and fall of the primary capture trap and the secondary focus trap. The two-position five-way valve is used to control the on/off of the gas path, so that the cylinder can drive the primary capture trap and the secondary focus trap move up and down between the high and low temperature modules to make the primary capture trap and the secondary focus trap quickly switch between the high and low temperature modules, so as to achieve the low-temperature adsorption and the high-temperature thermal desorption of the organic compounds in the gas phase, and thus realizing the quantitative determination of the organic compounds. The device of the invention has a compact structure which is capable of performing low-temperature adsorption and enrichment of the gas-phase semi-volatile organic compounds in the atmosphere and then performing high-temperature thermal desorption operation, and it can be used for online sampling and pretreatment of the organic compounds in the gas phase.

In order to move the primary capture trap and the secondary focus trap up and down between the high temperature module and the low temperature module, a pair of pen-shaped cylinders are indirectly connected to the primary capture trap and the secondary focus trap through a Z-shaped stainless steel snap ring. One end of the Z-shaped stainless steel snap ring and the arm joint of the pen-shaped cylinder are fixed by a hexagonal screw, and the other end and the primary capture trap and the secondary focus trap are fixed by screws through a rectangular stainless steel module. A semi-cylinder is provided at the center of the rectangular stainless steel module based on the sizes of the primary capture trap and the secondary focus trap, so that the primary capture trap and the secondary focus trap can be fixed.

When the device is applied in the collection and thermal desorption unit for the $C_{12}$-$C_{24}$ high-carbon organic compounds, the limited enrichment sampling amount cannot meet the detection limit requirements of the subsequent detection instruments, so it is necessary to add a secondary focus trap behind the primary capture trap to increase the concentration ratio of the organic compounds to meet the detection requirements. In order to avoid the organic compounds active site in the pipeline which may affect the organic compounds analysis, the primary capture trap and the secondary focus trap are both passivated, and the primary capture trap and the secondary focus trap are filled with the corresponding adsorbents.

In the embodiment, the device further includes a heat insulating gasket 8, and the joints between the plastic connecting column and the high temperature module and the low temperature module are provided with the heat insulating gaskets to minimize the temperature interface. Preferably, the heat insulating gasket is a plastic gasket of 5 mm*10 mm*1 mm.

Alternatively, the rectangular stainless steel module comprises two rectangular stainless steel sub-modules 30, stainless steel screws and screw holes 31, and the two rectangular stainless steel sub-modules are arranged in parallel in a horizontal direction and are oppositely arranged in a vertical direction. Two semi-circular holes are arranged oppositely on the central area of the facing sides of the two rectangles stainless steel sub-modules. When the two rectangular stainless steel sub-modules are closely fitted, the two upper and lower semi-circular holes can be tightly engaged to fit the primary capture trap and the secondary focus trap, so the primary capture trap and the secondary focus trap can be fixed. The horizontal outer ends of the two rectangular stainless steel sub-modules are symmetrically disposed with screw holes in the horizontal direction, the screw holes are arranged in a vertical direction, and the stainless steel screws can be threadedly engaged in the screw holes.

In this embodiment, the online measuring system further includes a programmable logic controller 48 and a temperature transmitter (not shown in the FIG.s), the programmable logic controller is respectively electrically connected with the three-way electromagnetic valve, the two-position six-way valve, the gas chromatograph, the mass flow controller, the gas pump, the enrichment-thermal desorption device and the temperature transmitter, and it can simultaneously control the opening and closing of each component in the online measuring system for semi-volatile organic compounds in a gas phase and monitor various system parameters such as temperature parameters and flow parameters. The temperature transmitter is connected with the temperature sensor (PT100) of the enrichment-thermal desorption device, the temperature transmitter is connected to the programmable logic controller to control and monitor the constant high temperature and constant low temperature of the enrichment-thermal desorption device, and the temperature control accuracy is ±0.1° C.

In this embodiment, a complete measurement cycle of the online measuring system comprises an aging mode, a sampling mode, a sweep mode, a focus mode and an injection mode. The gas supply and pressure control system can provide the nitrogen, the helium, the hydrogen and the compressed air with a purity of not less than 99.999% and can control the gas pressure. The gas chromatograph can use the helium, the hydrogen, and the compressed air. The entire system can use the helium or the nitrogen as a carrier gas.

The operation process of the above-mentioned online measuring system for the semi-volatile organic compounds in the gas phase includes system aging, sampling, sweeping, focusing and injecting, which can realize the enrichment and online measurement of the gas-phase semi-volatile organic compounds.

The specific steps are as follows.

In an aging mode, in order to remove the substances or impurities that may remain in the pipeline, the carrier gas purges and ages the pipelines and components between the three-way electromagnetic valve and the mass flow controller after passing through the gas supply and pressure control system, while both the primary capture trap and the secondary focus trap are in the high-temperature thermal desorption of the enrichment-thermal desorption device.

In a sampling mode, the primary capture trap and the secondary focus trap are driven at the low-temperature enrichment of the enrichment-thermal desorption device, the atmospheric sample is discharged through the gas pump after passing through the filter head, the three-way electromagnetic valve, the primary capture trap, the secondary focus trap, the two-position six-way valve and the mass flow controller by the suction of the gas pump, while the target organic compounds in the atmosphere is enriched by the primary capture trap.

In a sweep mode, the primary capture trap and the second focus trap are still kept in the low-temperature enrichment of the enrichment-thermal desorption device, the carrier gas will sweep the primary capture trap and the subsequent pipelines and components to remove the excess interfering gas such as residual oxygen therein after passing through the gas supply and pressure control system and the three-way electromagnetic valve.

In a focus mode, the primary capture trap is driven to move to the high-temperature thermal desorption of the enrichment-thermal desorption device while the secondary focus trap is still at the low-temperature enrichment of the enrichment-thermal desorption device, and the carrier gas will sweep the test sample from the primary capture trap to the secondary focus trap at the low-temperature enrichment state to perform secondary capture of the organic compounds after passing through the gas supply and pressure control system and the three-way electromagnetic valve.

In an injection mode, the secondary focus trap is driven to move to the high-temperature thermal desorption of the enrichment-thermal desorption device, and the carrier gas will carry the test sample released from the secondary focus trap at the high temperature device into the gas chromatograph to perform separating and measuring after passing through the gas supply and pressure control system, the three-way electromagnetic valve and the primary capture trap, thereby completing a sampling and analysis cycle.

The cycle will be repeated if the measurement is continued.

Preferably, the entire system and components can be time-series controlled by a computer interactive control system, and the five modes can be automatically cycled.

More specifically, the online measuring method of the above online measuring system for the semi-volatile organic compounds in the gas phase comprises following steps.

The complete measurement cycle of the online measuring method comprises an aging mode, a sampling mode, a sweep mode, a focus mode and an injection mode. The gas supply and pressure control system can provide the nitrogen, the helium, the hydrogen and the compressed air with a purity of not less than 99.999% and can control the gas pressure. The gas chromatograph can use the helium, the hydrogen, and the compressed air. The entire system can use the helium or the nitrogen as a carrier gas. The operation of the entire system will be described in detail regarding the nitrogen as the carrier gas.

The online measuring method of the above online measuring system for the semi-volatile organic compounds in the gas phase comprises following steps.

In the aging mode, the ports A-C of the three-way electromagnetic valve are connected to each other, both the mass flow controller and the gas pump are open, the interfaces A and B of the two-position six-way valve are connected to each other, the interfaces C and D are connected to each other, the interfaces E and F are connected to each other, and the gas chromatograph is normally operated. The finger platform cylinder is driven to open by the nitrogen from the gas supply and pressure control system, in order to make the high temperature module and the low temperature module open. Then the pen-shaped cylinder of the primary capture trap is driven by the nitrogen, and accordingly the primary capture trap is driven to move up by the pen-shaped cylinder. Then in the similar way, the pen-shaped cylinder of the secondary focus trap is driven by the nitrogen, and accordingly the second focus trap is driven to move up by the pen-shaped cylinder. In the end, both the primary capture trap and the secondary focus trap are at the high temperature module of 310° C. The nitrogen can wash and age the entire sampling pipelines and the pipe fittings through the gas supply and pressure control system and the interfaces A-C of the three-way electromagnetic valve, and is finally discharged by the mass flow controller and the gas pump to take out the substances that may remain in the system, in order to avoid the influences made by the last samples to the present samples.

In the sampling mode, after the aging and washing of the entire pipelines and the pipe fittings, the ports B and C of the three-way electromagnetic valve are connected to each other, both the mass flow controller and the gas pump are open, the interfaces A and B of the two-position six-way valve are connected to each other, the interfaces C and D are connected to each other, the interfaces E and F are connected to each other, and the gas chromatograph is normally operated. The high temperature module and the low temperature module are open by the finger platform cylinder driven by the nitrogen. Then the pen-shaped cylinder is driven to move the secondary focus trap down to the low temperature module, and then the pen cylinder is driven to move the primary capture trap down to the low temperature module of −23° C. The ambient air passes through the filter head, the ports B and C of the three-way electromagnetic valve, and is captured at the primary capture trap whose temperature is stable at −23° C., and then is discharged into the atmosphere via the interfaces E and F of the two-position six-way valve, the secondary focus trap, the interfaces C and D of the two-position six-way valve, the mass flow controller and the gas pump. At the same time, the nitrogen enters the gas chromatograph through the air supply and pressure control system and the interfaces A and B of the two-position six-way valve to keep the normal operation of the gas chromatograph.

In the sweep mode, the ports A-C of the three-way electromagnetic valve are connected to each other, both the mass flow controller and the gas pump are open, the interfaces A and B of the two-position six-way valve are connected to each other, the interfaces C and D are connected to each other, the interfaces E and F are connected to each other, and the gas chromatograph is normally operated. The primary capture trap is still at the low temperature module.

The nitrogen can sweep the primary capture trap and the subsequent pipelines and fittings through the gas supply and pressure control system and the interfaces A-C of the three-way electromagnetic valve, and is finally discharged through the gas pump, in order to avoid the interference of the oxygen, carbon dioxide and other components in the pipelines and fittings to the measuring results. At the same time, the nitrogen enters the gas chromatograph through the air supply and pressure control system and the interfaces A and B of the two-position six-way valve to keep the normal operation of the gas chromatograph.

In the focus mode, the ports A-C of the three-way electromagnetic valve are connected to each other, both the mass flow controller and the gas pump are open, the interfaces A and B of the two-position six-way valve are connected to each other, the interfaces C and D are connected to each other, the interfaces E and F are connected to each other, and the gas chromatograph is normally operated. The finger platform cylinder is driven by the nitrogen to open the high temperature module and the low temperature module. Then, the pen cylinder is driven to move the primary capture trap up to the high temperature module of 310° C., and keep the secondary focus trap at the low temperature module of −10° C. After passing through the gas supply and pressure control system and the ports A-C of the three-way electromagnetic valve, the nitrogen can bring the desorbed test material in the primary capture trap at the high temperature to the secondary focus trap at a low temperature through the ports E and F of the two-position six-way valve, and the test material can be enriched by the adsorbent at the low temperature. Then the nitrogen is discharged into the atmosphere through the ports C and D of the two-position six-way valve, the mass flow controller, and the gas pump. At the same time, the nitrogen enters the gas chromatograph through the air supply and pressure control system and the interfaces A and B of the two-position six-way valve to keep the normal operation of the gas chromatograph.

In the injection mode, the ports A-C of the three-way electromagnetic valve are connected to each other, both the mass flow controller and the gas pump are closed, the two-position six-way valve is switched to make the interfaces A and F connected to each other, the interfaces B and C connected to each other, the interfaces E and D connected to each other, and the gas chromatograph is normally operated. The finger platform cylinder is driven by the nitrogen to open the high temperature module and the low temperature module, and then the pen-shaped cylinder is driven to move the secondary focus trap up to the high temperature module of 310° C. The nitrogen enters the secondary focus trap through the gas supply and pressure control system and the interfaces A-F of the two-position six-way valve, and desorbs the test material, and then enters the gas chromatograph through the interfaces B and C of the two-position six-way valve. Finally the test material is separated and detected by the gas chromatograph. The gas chromatograph automatically saves the test data after the measurement and continues to run to prepare for the next measurement. After the desorption and injection are completed, the two-position six-way valve is switched to the original position, that is, the interfaces A and B, C and D, and E and F are connected to each other, the primary capture trap and the secondary focus trap are still at the high temperature module, ready for the aging mode in the next cycle.

In the operation cycle of the system, the five working modes can be continuously and automatically switched through the control of the time series of the computer interactive control system. The time resolution of the whole running cycle is 23-53 minutes, wherein the aging period is 5 minutes, the sampling period is 10-40 minutes, the sweep period is 0.5 minute, the focus period is 6 minutes, and the injection period is 1.5 minutes. Throughout the working cycle, the two-position six-way valve 3 and the entire pipelines are maintained at a constant temperature of 280° C. to prevent the loss of the high carbon organic compounds in the system due to the uneven temperatures.

Figure 6:
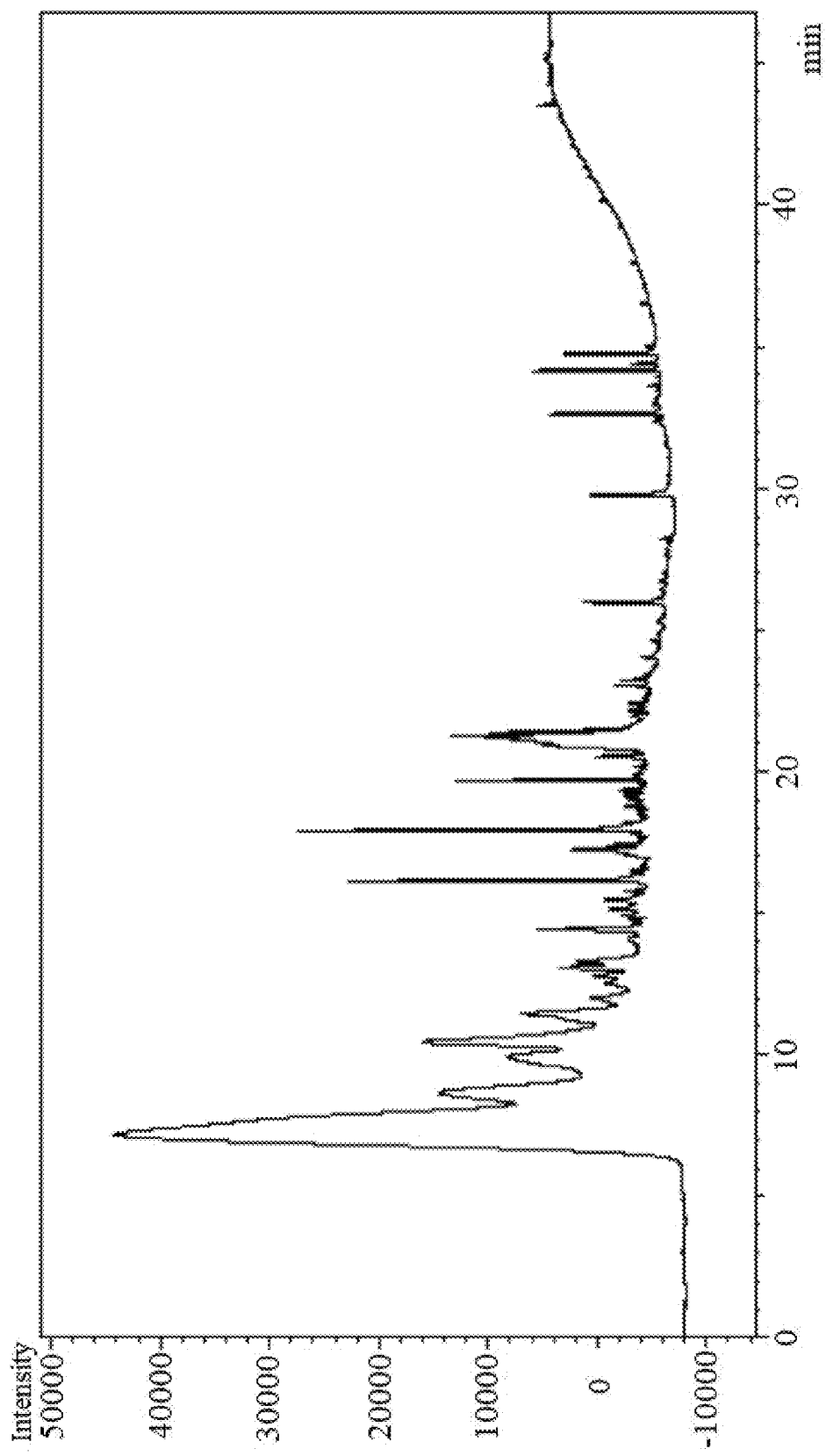
FIG. 6 is a schematic diagram showing the results of online monitoring of the semi-volatile organic compounds using the system in the present disclosure.

FIG. 6 is a schematic diagram showing the monitoring results of the components of the gas-phase organic compounds using the online measuring system for the semi-volatile organic compounds in the gas phase in the present disclosure. The abscissa is the retention time, and the ordinate is the signal strength of the flame ionization detector (FID). The semi-volatile organic compounds in the gas phase in the atmosphere can be characterized and quantified through the separation of the gas chromatograph and the FID detection.

Although the embodiments of the present invention have been disclosed for the purpose of illustration, it is understood by those skilled in the art that various alternatives, variations and modifications can be made without departing from the spirit and scope of the present invention. Therefore, the scope of the present invention is not limited to the contents disclosed in the embodiments.

We claim:

1. An online measuring system for semi-volatile organic compounds in a gas phase, wherein the system comprises a filter head, a three-way electromagnetic valve, an enrichment-thermal desorption device, a two-position six-way valve, a mass flow controller, a gas pump, a gas chromatograph, a primary capture trap, a secondary focus trap, and a gas supply and pressure control system, the three-way electromagnetic valve includes a port A, a port B, and a port C, the inlet of the filter head is connected to be provided with a sampling object, the outlet of the filter head is connected with the port B of the three-way electromagnetic valve through a passivated stainless steel tube, the port C of the three-way electromagnetic valve is connected with the inlet of the primary capture trap through a passivated stainless steel tube, and the port A of the three-way electromagnetic valve is connected to the gas supply and pressure control system through a passivated stainless steel tube;

the two-position six-way valve includes an interface A, an interface B, an interface C, an interface D, an interface E, and an interface F, the outlet of the primary capture trap is connected to the interface E of the two-position six-way valve via a passivated stainless steel tube with an external diameter of ⅛ inch, the interface F of the two-position six-way valve is connected to the inlet of the secondary focus trap via a passivated stainless steel tube with an external diameter of ⅛ inch, and the interface C of the two-position six-way valve is connected to the outlet of the secondary focus trap, the interface D of the two-position six-way valve is connected to the inlet of the mass flow controller, the interface A of the two-position six-way valve is connected to the gas supply and pressure control system, and the interface B of the two-position six-way valve is connected to a capillary column of the gas chromatograph, the outlet of the mass flow controller is connected to the inlet of the gas pump, and the outlet of the gas pump is connected to the atmosphere;

the enrichment-thermal desorption device is connected to the primary capture trap and the secondary focus trap, and the enrichment-thermal desorption device can provide a constant low enrichment temperature and a constant high desorption temperature for the primary capture trap and the secondary focus trap;

the gas supply and pressure control system is capable of providing nitrogen, helium, hydrogen, and compressed air with a purity of not less than 99.999%, and capable of controlling the pressure of the gas path;

the enrichment-thermal desorption device includes two combined temperature modules and a pneumatic driving device, the primary capture trap and the secondary focus trap are respectively connected to the two combined temperature modules via detachable connections, the two combined temperature modules are disposed opposite to each other in the longitudinal direction, and each combined temperature module is disposed in a vertical direction, the two combined temperature modules are capable of performing low-temperature adsorption and enrichment of the semi-volatile organic compounds in a gas phase in atmosphere and then performing high-temperature thermal desorption operation, the pneumatic driving device is respectively connected with the two combined temperature modules, the primary capture trap, and the secondary focus trap, and the pneumatic driving device can drive the two combined temperature modules to move closer to each other or away from each other in the longitudinal direction, when the combined temperature modules are moved closer to each other and contacted with the device, the primary capture trap and the secondary focus trap can be tightly clamped, and when the combined temperature modules are moved away from each other and separated from the device, the primary capture trap and the secondary focus trap can be released, and the pneumatic driving device can also drive the primary capture trap and the secondary focus trap to move up or down in the vertical direction;

a pipeline comprising the above passivated stainless steel tubes is formed for the semi-volatile organic compounds in a gas phase to flow in the online measuring system.

2. The online measuring system for semi-volatile organic compounds in a gas phase according to claim 1, wherein the filter head is made of the high-purity polytetrafluoroethylene;

alternatively, the primary capture trap and the secondary focus trap are filled with adsorbents, and the column diameter of the primary capture trap is larger than that of the secondary focus trap;

alternatively, the primary capture trap and the secondary focus trap are both made of 316 stainless steel tubes;

alternatively, the helium, the hydrogen, and the compressed air can be used in the gas chromatograph, and helium or nitrogen can be used as a carrier gas within the pipeline of the system, alternatively, the constant low enrichment temperature is −23° C., and the constant high thermal desorption temperature is 310-325° C.

3. The online measuring system for semi-volatile organic compounds in a gas phase according to claim 1, wherein the pipeline between the primary capture trap and the inlet of the gas chromatograph is tightly wound with heating wires capable of setting a constant temperature of 280° C. for the pipeline between the primary capture trap and the inlet of the gas chromatography, and the interface of the two-position six-way valve is provided with a heat tracing device.

4. The online measuring system for semi-volatile organic compounds in a gas phase according to claim 1, wherein the combined temperature module includes a high temperature module and a low temperature module disposed in connection, the high temperature module includes an aluminum thermal-block casing, a copper medium, an insulating cotton, a stainless steel screw, a heating rod, and a temperature sensor, the aluminum thermal-block casing is arranged in a horizontal direction and has a hollow shape with an opening on the longitudinal side, the copper medium is provided in the hollow interior of the aluminum thermal-block casing, the insulating cotton is provided between the copper medium and the aluminum thermal-block casing densely, and the copper medium is connected to the aluminum thermal-block casing via the high-temperature-resistant stainless steel screw;

a semi-cylindrical upper capture trap placement half-slot is provided horizontally in connection to the central portion of the opening side of the aluminum thermal-block casing, the copper medium and the insulating cotton, an upper secondary focus trap placement half-slot is provided in parallel with distance on the aluminum thermal-block casing, the copper medium and the insulating cotton, the upper capture trap placement half-slot is able to tightly fit half of the primary capture trap, and the upper secondary focus trap placement half-slot is able to tightly fit half of the secondary focus trap;

two pairs of blind holes are provided separately on the horizontal side of the aluminum thermal-block casing and the copper medium, and each pair of blind holes are correspondingly disposed on the aluminum thermal-block casing and the copper medium, each of the two pairs of blind holes can tightly fit the heating rod capable of providing a required high temperature and the temperature sensor capable of detecting the temperature of the copper medium;

the low temperature module includes an aluminum cold-block casing, a copper medium, an insulating cotton, a plastic screw, a cooling sheet and a temperature sensor, the aluminum cold-block casing is arranged in a horizontal direction and has a hollow shape with an opening on the longitudinal side, the copper medium is provided in the hollow interior of the aluminum cold-block casing, the copper medium at the opposite side of the opening is closely connected with the cold end of the cooling sheet through a thermal grease layer, the aluminum cold-block casing outside the cooling sheet is hollow, the hot end of the cooling sheet can be connected with the overheated-copper-tube heat sink through another thermal grease layer, the insulating cotton is provided between the copper medium and the aluminum cold-block casing densely, and the copper medium is connected to the aluminum cold-block casing via the plastic screw;

a semi-cylindrical bottom capture trap placement half-slot is provided horizontally in connection to the central portion of the opening side of the aluminum cold-block casing, the copper medium and the insulating cotton, a bottom secondary focus trap placement half-slot is provided in parallel with distance on the aluminum cold-block casing, the copper medium and the insulating cotton, the bottom capture trap placement half-slot is able to tightly fit half of the primary capture trap, and the bottom secondary focus trap placement half-slot is able to tightly fit half of the secondary focus trap;

another two pairs of blind holes are provided separately on the horizontal side of the aluminum cold-block casing and the copper medium, and each pair of blind holes are correspondingly disposed on the aluminum cold-block casing and the copper medium, each of the two pairs of blind holes can tightly fit the temperature sensor capable of detecting the temperature of the copper medium, the outer side of the copper medium is closely attached with a cooling sheet capable of providing the demanded low temperature, the high temperature module and the low temperature module on the same side are arranged in parallel with distance in the vertical direction and connected to each other through the plastic connecting column;

the two upper capture trap placement half-slots and two bottom capture trap placement half-slots of the two combined temperature modules positioned opposite to each other can respectively be relatively close to each other, and they can be tightly fitted with the primary capture trap when they are close, the two upper focus trap placement half-slots and two bottom focus trap placement half-slots of the two combined temperature modules positioned opposite to each other can respectively be relatively close to each other, and they can be tightly fitted with the secondary focus trap when they are close.

5. The online measuring system for semi-volatile organic compounds in a gas phase according to claim 4, wherein the pneumatic driving device comprises a finger platform cylinder, a pen-shaped cylinder, a plurality of two-position five-way valves and a PU pneumatic high-pressure tube, the finger platform cylinder is connected with the bottom of each combined temperature module by stainless steel screws, the air inlet and the air outlet of the finger platform cylinder are respectively connected with a working port of one of the plurality of the two-position five-way valves, the air inlet of the one of the plurality of the two-position five-way valves is connected with the gas supply and the pressure control system, and the two exhaust ports of the one of the plurality of the two-position five-way valves are connected with a muffler, and the finger platform cylinder can drive the two temperature modules to move closer to each other or away from each other in the longitudinal direction through the one of the plurality of the two-position five-way valves and the gas supply and the pressure control system;

the horizontal ends of the primary capture trap and the secondary focus trap are respectively connected to a pen-shaped cylinder, so that a pair of pen-shaped cylinders jointly drive the movement of the primary capture trap and the secondary focus trap, the pen-shaped cylinders are connected to the primary capture trap and the secondary focus trap through a Z-shaped stainless steel snap ring and a rectangular stainless steel module, the rectangular stainless steel module can be detachably engaged with the primary capture trap and the secondary focus trap, the rectangular stainless steel module is connected with the Z-shaped stainless steel snap ring via the stainless steel screw, the Z-shaped stainless steel snap ring is connected with the pen-shaped cylinder through a hexagonal stainless steel screw;

the inlet port and the outlet port of the pen-shaped cylinder are respectively connected with the first working port and the second working port of another one of the plurality of the two-position five-way valves through the PU pneumatic high-pressure tube, the air inlet of the another one of the plurality of the two-position five-way valves is connected with the gas supply and pressure control system, the two exhaust ports of the another one of the plurality of the two-position five-way valves are connected with the muffler, the pen-shaped cylinder can drive the primary capture trap and the secondary focus trap move back and forth in a vertical direction through driving the another one of the plurality of the two-position five-way valves and the gas supply and the pressure control system;

the device further includes a heat insulating gasket, and the joints between the plastic connecting column and the high temperature module and the low temperature module are provided with the heat insulating gaskets to minimize the temperature interface;

the rectangular stainless steel module comprises two rectangular stainless steel sub-modules, stainless steel screws and screw holes, and the two rectangular stainless steel sub-modules are arranged in parallel in a horizontal direction and are oppositely arranged in a vertical direction, two semi-circular holes are arranged oppositely on the central area of the facing sides of the two rectangles stainless steel sub-modules, when the two rectangular stainless steel sub-modules are closely fitted, the two upper and lower semi-circular holes can be tightly engaged to fit the primary capture trap and the secondary focus trap, so the primary capture trap and the secondary focus trap can be fixed, the horizontal outer ends of the two rectangular stainless steel sub-modules are symmetrically disposed with screw holes in the horizontal direction, the screw holes are arranged in a vertical direction, and the stainless steel screws can be threadedly engaged in the screw holes.

6. The online measuring system for semi-volatile organic compounds in a gas phase according to claim 1, wherein the online measuring system further includes a programmable logic controller and a temperature transmitter, the programmable logic controller is respectively electrically connected with the three-way electromagnetic valve, the two-position six-way valve, the gas chromatograph, the mass flow controller, the gas pump, the enrichment-thermal desorption device and the temperature transmitter, and it can simultaneously control the turning on and off of the three-way electromagnetic valve, the two-position six-way valve, the gas chromatograph, the mass flow controller, the gas pump, the enrichment-thermal desorption device and the temperature transmitter and monitor various system parameters, the temperature transmitter is connected with the enrichment-thermal desorption device, the temperature transmitter is connected to the programmable logic controller to control and monitor the constant high temperature and constant low temperature of the enrichment-thermal desorption device, and the temperature control accuracy is ±0.1° C.

7. An online measuring method of the online measuring system for semi-volatile organic compounds in a gas phase according to any one of claims 1 to 6, wherein, the method comprises:

in an aging mode, in order to remove the substances or impurities that may remain in the pipeline of the system, a carrier gas purges and ages the pipelines and components between the three-way electromagnetic valve and the mass flow controller after passing through the gas supply and pressure control system, while both the primary capture trap and the secondary focus trap are located where the high-temperature thermal desorption is performed in the enrichment-thermal desorption device;

in a sampling mode, the primary capture trap and the secondary focus trap are located where the low-temperature enrichment is performed in the enrichment-thermal desorption device, an atmospheric sample is discharged through the gas pump after passing through the filter head, the three-way electromagnetic valve, the primary capture trap, the secondary focus trap, the two-position six-way valve and the mass flow controller by the suction of the gas pump, while the target organic compound in the atmosphere is enriched by the primary capture trap;

in a sweep mode, the primary capture trap and the second focus trap are still located where the low-temperature enrichment is performed in the enrichment-thermal desorption device, the carrier gas will sweep the primary capture trap and the subsequent pipelines and components to remove excess interfering gas such as residual oxygen therein after passing through the gas supply and pressure control system and the three-way electromagnetic valve;

in a focus mode, the primary capture trap is driven to move to where the high-temperature thermal desorption is performed in the enrichment-thermal desorption device while the secondary focus trap is still located where the low-temperature enrichment is performed in the enrichment-thermal desorption device, and a carrier gas will sweep the test sample from the primary capture trap to the secondary focus trap at a low-temperature enrichment state to perform secondary capture of the target organic compound after passing through the gas supply and pressure control system and the three-way electromagnetic valve;

in an injection mode, the secondary focus trap is driven to move to where the high-temperature thermal desorption is performed in the enrichment-thermal desorption device, and the carrier gas will carry the test sample released from the secondary focus trap at the high temperature module into the gas chromatograph to perform separating and measuring after passing through the gas supply and pressure control system, the three-way electromagnetic valve and the primary capture trap, thereby completing a sampling and analysis cycle;

the sampling and analysis cycle will be repeated if the measurement is continued.

\* \* \* \* \*